United States Patent
Gao et al.

(10) Patent No.: US 11,831,393 B2
(45) Date of Patent: Nov. 28, 2023

(54) LARGE-SCALE MIMO SATELLITE MOBILE COMMUNICATION METHOD AND SYSTEM

(71) Applicant: SOUTHEAST UNIVERSITY, Jiangsu (CN)

(72) Inventors: Xiqi Gao, Jiangsu (CN); Li You, Jiangsu (CN); Kexin Li, Jiangsu (CN); Jiaheng Wang, Jiangsu (CN); Wenjin Wang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 244 days.

(21) Appl. No.: 17/268,336

(22) PCT Filed: Oct. 10, 2019

(86) PCT No.: PCT/CN2019/110248
§ 371 (c)(1),
(2) Date: Feb. 12, 2021

(87) PCT Pub. No.: WO2021/035880
PCT Pub. Date: Mar. 4, 2021

(65) Prior Publication Data
US 2021/0288715 A1  Sep. 16, 2021

(30) Foreign Application Priority Data

Aug. 29, 2019 (CN) .......................... 201910805571.5

(51) Int. Cl.
*H04B 7/185* (2006.01)
*H04B 7/0408* (2017.01)
(Continued)

(52) U.S. Cl.
CPC ....... *H04B 7/18513* (2013.01); *H04B 7/0408* (2013.01); *H04B 7/0456* (2013.01); *H04W 72/04* (2013.01)

(58) Field of Classification Search
CPC .......................... H04B 7/18513; H04B 7/0408; H04B 7/0456; H04W 72/04
See application file for complete search history.

(56) References Cited

U.S. PATENT DOCUMENTS

| 10,291,347 | B2 * | 5/2019 | Wang | ...................... | H04B 1/715 |
| 2008/0019345 | A1 * | 1/2008 | Wu | ........................ | H04W 16/10 |
| | | | | | 370/341 |

(Continued)

FOREIGN PATENT DOCUMENTS

| CN | 103220773 A | 7/2013 |
| CN | 103580738 A | 2/2014 |

(Continued)

*Primary Examiner* — Bailor C Hsu
(74) *Attorney, Agent, or Firm* — Muncy, Geissler, Olds & Lowe, P.C.

(57) ABSTRACT

The present invention discloses a large-scale MIMO satellite mobile communication method and system. A satellite or gateway station uses spatial angle information of user terminals to group the users to be served in the coverage area to form space division user groups, wherein the user terminals in the same group use the same time-frequency resources to communicate with the satellite, while the user terminals in different groups use different time-frequency resources to communicate with the satellite. For the user terminals in the same space division user group, the satellite or gateway station uses statistical channel information of each user terminal to calculate a downlink precoding vector and an uplink receiving processing vector corresponding to each user terminal, and then uses the obtained vectors to perform downlink precoding transmission and uplink received signal processing. The user terminal uses Doppler frequency shift resulted from the movement of the satellite and minimum propagation time delay of long-distance propagation to make compensation for the frequency and time of the signal received and sent by the user terminal. The (Continued)

present invention can greatly improve the spectrum efficiency and power efficiency of a satellite mobile communication system and reduce the implementation complexity of the satellite mobile communication system.

5 Claims, 7 Drawing Sheets

(51) Int. Cl.
  *H04B 7/0456* (2017.01)
  *H04W 72/04* (2023.01)

(56) References Cited

U.S. PATENT DOCUMENTS

| | | | | |
|---|---|---|---|---|
| 2008/0247488 A1* | 10/2008 | Li | ........................ | H04L 5/0048 375/299 |
| 2010/0142390 A1* | 6/2010 | Sun | ....................... | H04L 5/0023 370/252 |
| 2010/0284351 A1* | 11/2010 | Liang | ................... | H04B 7/0639 370/329 |
| 2011/0149723 A1* | 6/2011 | Gong | .................... | H04L 1/1887 370/242 |
| 2011/0188586 A1 | 8/2011 | Bidigare et al. | | |
| 2012/0281659 A1* | 11/2012 | Zhang | .................. | H04B 7/0452 370/329 |
| 2014/0185564 A1* | 7/2014 | Dong | ...................... | H04L 43/08 370/329 |
| 2014/0219124 A1* | 8/2014 | Chang | .................. | H04B 7/0413 370/252 |
| 2015/0207547 A1* | 7/2015 | Ko | ......................... | H04W 72/21 370/252 |
| 2015/0381396 A1* | 12/2015 | Chen | ................... | H04L 41/0803 370/254 |
| 2016/0043794 A1* | 2/2016 | Ashrafi | ............... | H04L 27/2017 370/329 |
| 2016/0142117 A1* | 5/2016 | Rahman | ............... | H04B 7/0486 375/267 |
| 2018/0248592 A1* | 8/2018 | Ashrafi | ................ | H04L 5/0048 |
| 2019/0313357 A1* | 10/2019 | Wang | ................ | H04W 56/0045 |
| 2021/0194641 A1* | 6/2021 | Liu | ........................ | H04L 1/1887 |

FOREIGN PATENT DOCUMENTS

| | | |
|---|---|---|
| CN | 106302274 A | 1/2017 |
| CN | 109547075 A | 3/2019 |
| CN | 109787665 A | 5/2019 |

* cited by examiner

LARGE-SCALE MIMO SATELLITE MOBILE COMMUNICATION METHOD AND SYSTEM

TECHNICAL FIELD

The present invention relates to a satellite mobile communication method and system equipped with an antenna array or large-scale antenna array, in particular to a satellite mobile communication method and system utilizing large-scale MIMO technique.

BACKGROUND ART

The continuously growing demand for mobile Internet and Internet of Things applications drives the rapid development of wireless mobile communication. Terrestrial 5G technology, which supports tens of Gbps data rate and millions of terminal connections per square kilometer, is about to be applied commercially. The research on 6G mobile communication is on the agenda, and the radio resources will be developed and utilized in the whole spectrum. The 6G mobile communication will support transmission rates up to Tbps and connections of tens of millions of terminals per square kilometer, and will be developed to support deep global coverage and mobile information services in all scenarios. Mobile communication will become information infrastructure supporting the operation of the entire industry and society.

Satellite mobile communication is the key facility to support deep global coverage and mobile information services in all scenarios. With the development and utilization of the oceans, polar regions and air spaces by human beings, there is an increasing application demand for information and communication services at anytime, anywhere without interruption. However, the terrestrial mobile networks only cover 20% of the global land area. Therefore, it is urgent to develop satellite mobile communication to realize deep global coverage and support enhanced mobile Internet broadband communication and IoT machine-type communication. In recent years, satellite mobile communication utilizing high-orbit satellites, medium-orbit satellites and low-orbit satellites has attracted wide attention in the industry.

Large-scale Multi-Input Multi-Output (MIMO) technique can serve dozens of users on the same time-frequency resources by providing a large number of antennas at the base station side, and has become one of the key techniques of 5G mobile communication, and its further research and application will also be an important development direction of mobile communication after 5G. Most of the existing satellite mobile communication systems are consistent with the early terrestrial cellular mobile communication, and employ multi-color reuse multi-beam communication architecture, which has the bottleneck problems of limited power and low spectrum resource multiplexing ability. Extending and applying the large-scale MIMO technology to satellite mobile communication systems to build up large-scale MIMO satellite mobile communication methods and construct large-scale MIMO satellite mobile communication systems have important practical significance for improving the spectrum and power efficiency of satellite mobile communication.

CONTENTS OF THE INVENTION

Object of the Invention: the object of the present invention is to provide a large-scale MIMO satellite mobile communication method and system, so as to solve the bottleneck problems of limited power and low spectrum resource multiplexing ability in the traditional multi-color reuse multi-beam communication approach, greatly improve the spectrum efficiency and power efficiency of satellite mobile communication systems and reduce the implementation complexity.

Technical Solution: a large-scale MIMO satellite mobile communication method is applied to a satellite or a gateway station associated to the satellite, wherein the satellite is equipped with an antenna array to communicate with user terminals in its coverage areas; the method comprises the following steps:

using spatial angle information of the user terminals, by the satellite or gateway station, to group the users to be served in the coverage area to form space division user groups, wherein the user terminals in the same space division user group use the same time-frequency resources to communicate with the satellite, while the user terminals in different space division user groups use different time-frequency resources to communicate with the satellite;

for the user terminals in the same space division user group, using statistical channel information, including spatial angle information and average channel energy, of each user terminal to calculate a downlink precoding vector or uplink receiving processing vector corresponding to each user terminal, and using the obtained vector to perform downlink precoding transmission or uplink received signal processing by the satellite or gateway station:

performing user grouping and uplink and downlink transmission dynamically, with the change of the statistical channel information, in the movement process of the satellite or user terminals.

The statistical channel information is obtained through an uplink detecting process or a feedback information of the user terminals; in the uplink detecting process, each user sends a detecting signal periodically, and the satellite estimates the spatial angle or average channel energy information of each user according to the received detecting signal, the feedback information of each user terminal is spatial angle information, average channel energy or geographical location information of the user.

In the user grouping process, the spatial angle range of the satellite coverage area is divided into a corresponding number of sub-ranges by using several fixed reference spatial angles, which consist of a preset number of groups of reference spatial angles, and the array direction vectors corresponding to different reference spatial angles in each reference spatial angle group are orthogonal to each other; the spatial angle information of each user is utilized to determine a sub-range to which the user belongs; the user terminals to be served are grouped into space division user groups, different users in the same sub-range are assigned to different user groups, and the sub-range to which the users in the same user group belong corresponds to the same reference space angle group; the users in the space division user group use the same time-frequency resources to communicate with the satellite in the communication process, while the users in different space division user groups use different time-frequency resources to communicate with the satellite in the communication process.

The downlink precoding vector is calculated according to an average signal to loss plus noise ratio (ASLNR) criterion; the ASLNR of a user terminal is the ratio of the average power or expected power of signals received by the user when sending signals to the user to the sum of the average power or expected power leaked to other users and the power of noise, and the downlink precoding vector maximizes ASLNR of the user terminal; the downlink precoding vector is obtained by closed-form calculation with the spatial angle information and the average channel energy.

The uplink receiving processing vector is obtained by closed-form calculation according to an average signal to interference plus noise ratio (ASINR) criterion; the ASINR of a user terminal is the ratio of the average power or expected power of signals sent by the user to the sum of the average power or expected power of signals sent by other users and the power of noise in signals formed by a user receiving processing vector, and the uplink receiving processing vector maximizes ASINR of the user terminal; the uplink receiving processing vector is obtained by closed-form calculation with the spatial angle information and the average channel energy.

A large-scale MIMO satellite mobile communication method, which is applied to a user terminal, comprises the following steps:

sending a detecting signal to the satellite or feeding spatial angle information, average channel energy or geographical location information of the user to the satellite periodically, by the user terminal, wherein the spatial angle information is estimated according to a detecting signal or calculated according to the geographical location by the satellite, and is used by the satellite or a gateway station to group the users to be served in the coverage area to form space division user groups, wherein the user terminals in the same group use the same time-frequency resources to communicate with the satellite, while the user terminals in different groups use different time-frequency resources to communicate with the satellite;

receiving satellite signals and making compensation for the frequency and time of downlink received signals by using Doppler frequency shift resulted from the movement of the satellite and minimum propagation time delay of long-distance propagation, by the user terminal, wherein the satellite signals received by the user terminal are signals generated by the satellite by performing downlink precoding with statistical channel information, including spatial angle information and average channel energy and then sent through a channel;

using Doppler frequency shift resulted from the movement of the satellite and minimum propagation time delay of long-distance propagation to make compensation for the frequency and time of uplink transmission signals, and then sending the signals to the satellite, by the user terminal;

processing the uplink received signals by using an uplink receiving processing vector after the satellite receives the transmission signals, wherein the uplink receiving processing vector is calculated by the satellite by using statistical channel information including spatial angle information and average channel energy.

The Doppler frequency shift resulted from the movement of the satellite and the minimum propagation time delay of long-distance propagation are estimated by the user terminal according to a received synchronization signal, or calculated with the location information of the user terminal and the satellite; with the movement of the satellite or the user terminal, the Doppler frequency shift and the minimum propagation time delay information are updated dynamically, and the frequency and time compensation values are changed adaptively.

A device at the satellite side for large-scale MIMO satellite mobile communication comprises a memory unit, a processor and a computer program which is stored in the memory unit and executable on the processor, wherein the computer program, when loaded to the processor, implements the above-mentioned large-scale MIMO satellite mobile communication method applied to a satellite or gateway station.

A user terminal device for large-scale MIMO satellite mobile communication comprises a memory unit, a processor and a computer program which is stored in the memory unit and executable on the processor, wherein the computer program, when loaded to the processor, implements the above-mentioned large-scale MIMO satellite mobile communication method applied to a user terminal.

A large-scale MIMO satellite mobile communication system comprises a satellite and user terminals, wherein the satellite is equipped with an antenna array to communicate with the user terminals in its coverage area, the satellite or a gateway station associated to the satellite is configured to: use spatial angle information of the user terminals to group the users to be served in the coverage area to form space division user groups, wherein the user terminals in the same space division user group use the same time-frequency resources to communicate with the satellite, while the user terminals in different space division user groups use different time-frequency resources to communicate with the satellite;

for the user terminals in the same space division user group, use statistical channel information, including spatial angle information and average channel energy, of each user terminal to calculate a downlink precoding vector or uplink receiving processing vector corresponding to each user terminal, and use the obtained vector to perform downlink precoding transmission or uplink received signal processing; perform user grouping and uplink and downlink transmission processes dynamically with the change of the statistical channel information, in the movement process of the satellite or user terminals;

the user terminal is configured to: periodically send a detecting signal to the satellite or feed spatial angle information, average channel energy or geographical location information of the users to the satellite; receive satellite signals and use Doppler frequency shift resulted from the movement of the satellite and minimum propagation time delay of long-distance propagation to make compensation for the frequency and time of downlink received signals; and use Doppler frequency shift resulted from the movement of the satellite and minimum propagation time delay of long-distance propagation to make compensation for the frequency and time of uplink transmission signals, and then send the signals to the satellite.

Beneficial effects: compared with the prior art, the present invention has the following advantages.

(1) Large-scale MIMO technology is extended and applied to satellite mobile communication systems, so as to solve the bottleneck problems of limited power and low spectrum resource multiplexing ability in the traditional multi-color reuse multi-beam communication approach, and greatly improve the spectrum efficiency and power efficiency of satellite mobile communication systems.

(2) The characteristics of satellite mobile communication channels are fully utilized, long-time statistical channel information is utilized, the users are grouped into space division users groups, and downlink precoding transmission and uplink receiving processing are carried out in the groups, so that the inadaptability of direct application of the existing large-scale MIMO technique in terrestrial mobile communication to satellite mobile communication is overcome, the frequency spectrum and power efficiency are improved greatly, and the complexity of system implementation is reduced.

(3) The user grouping, downlink precoding vector calculation and uplink receiving-processing vector calculation only rely on a small amount of long-time statistical channel information, and the required information is easy to obtain. The communication method is suitable for Time Division Duplex (TDD) and Frequency Division Duplex (FDD) satellite mobile systems.

(4) The user terminal can make compensation for the frequency and time of the received signals and transmission signals by using Doppler frequency shift resulted from the movement of the satellite and minimum propagation time delay of long-distance propagation, so that the system design can be simplified. The communication method is suitable for satellite mobile communication using high-orbit satellites, medium-orbit satellites and low-orbit satellites.

DESCRIPTION OF DRAWINGS

To clearly describe the technical solution in the embodiments of the present invention, hereunder the drawings used in the description of the embodiments or the prior art will be introduced briefly. Apparently, the drawings described below only illustrate some embodiments of the present invention. The person skilled in the art can obtain drawings of other embodiments on the basis of these drawings without creative work.

EMBODIMENTS

To make the technical solution of the present invention understood better by those skilled in the art, hereunder the technical solution in the embodiments of the present invention will be described clearly and completely with reference to the drawings of the embodiments of the present invention. Apparently, the embodiments described below are only some embodiments of the present invention, and not all embodiments of the present invention. On the basis of the embodiments provided here, all other embodiments obtained by the person of ordinary skill in the art without creative work shall be deemed as falling into the scope of protection of the present invention.

Figure 1:
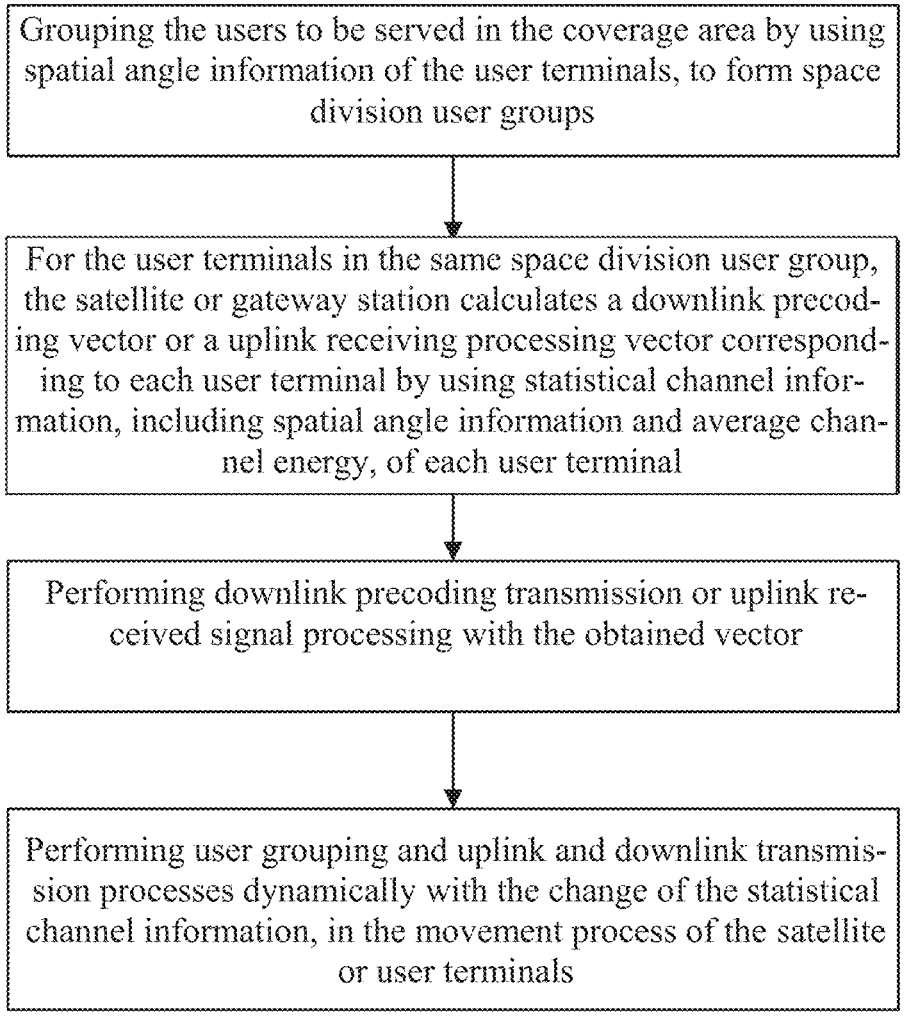
FIG. 1 is a flow chart of the processing method at the satellite side in large-scale MIMO satellite mobile communication.

As shown in FIG. 1, the large-scale MIMO satellite mobile communication method disclosed in an embodiment of the present invention is applied to a satellite or a gateway station associated to the satellite, wherein the satellite is equipped with an antenna array to communicate with user terminals in its coverage area. The method comprises:

the satellite or gateway station uses spatial angle information of the user terminals to group the users to be served in the coverage area to form space division user groups, wherein the user terminals in the same space division user group use the same time-frequency resources to communicate with the satellite, while the user terminals in different space division user groups use different time-frequency resources to communicate with the satellite; in the user grouping process, the spatial angle range of the satellite coverage area is divided into a corresponding number of sub-ranges by using several fixed reference spatial angles which consist of a preset number of groups of reference spatial angles, and the array direction vectors corresponding to different reference spatial angles in each reference spatial angle group are orthogonal to each other; a sub-range to which the user belongs is determined by using the spatial angle information of each user: the user terminals to be served are grouped into space division user groups, different users in the same sub-range are assigned to different user groups, and the sub-range to which the users in the same user group belong corresponds to the same reference space angle group; the users in the space division user group use the same time-frequency resources to communicate with the satellite in the communication process, while the users in different space division user groups use different time-frequency resources to communicate with the satellite in the communication process.

For the user terminals in the same space division user group, the satellite or gateway station uses statistical channel information, including spatial angle information and average channel energy, of each user terminal to calculate a downlink precoding vector or uplink receiving processing vector corresponding to each user terminal, and uses the obtained vector to perform downlink precoding transmission or uplink received signal processing, wherein the downlink precoding vector may be obtained by closed-form calculation according to an average signal to loss plus noise ratio (ASLNR) criterion, and the uplink receiving processing vector may be obtained by closed-form calculation according to an average signal to interference plus noise ratio (ASINR) criterion.

User grouping and uplink and downlink transmission processes are performed dynamically with the change of the statistical channel information, in the movement process of the satellite or user terminals.

In the above method, the statistical channel information may be obtained through an uplink detecting process or a feedback information of the user terminals; in the uplink detecting process, each user sends a detecting signal periodically, and the satellite estimates the spatial angle or average channel energy information of each user according to the received detecting signal; the feedback information of each user terminal is spatial angle information, average channel energy or geographical location information of the user.

Figure 2:
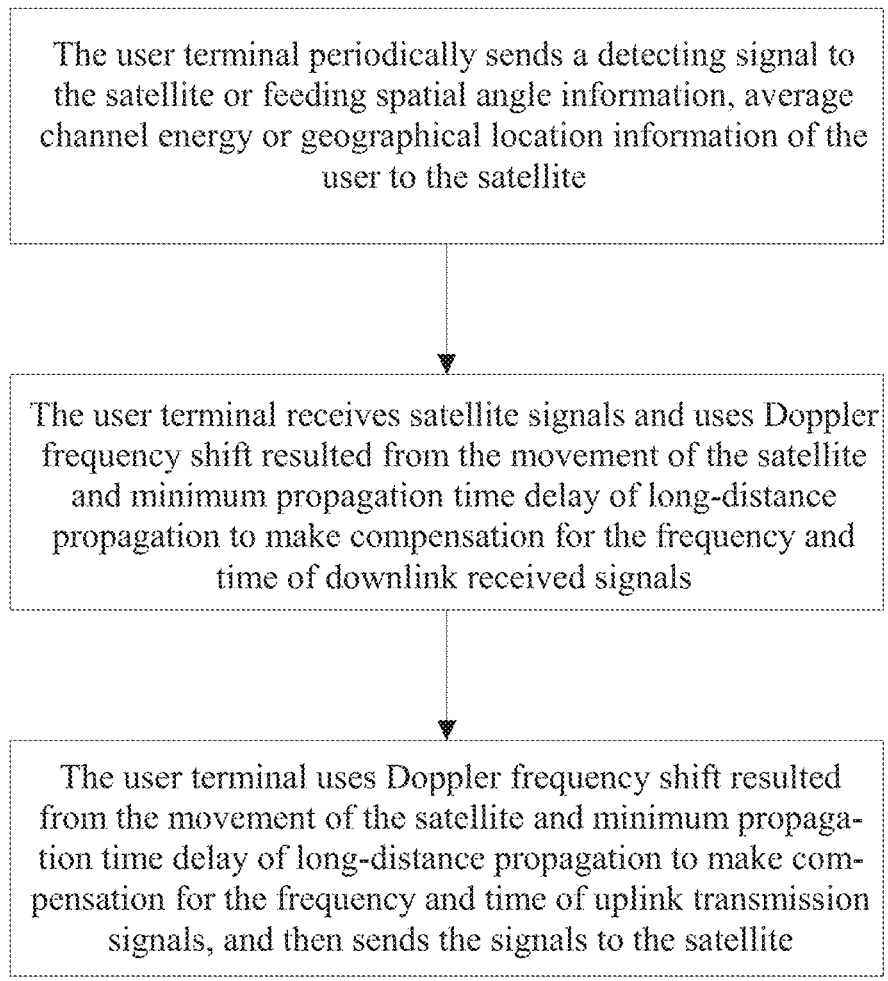
FIG. 2 is a flow chart of the processing method at the user terminal side in large-scale MIMO satellite mobile communication.

As shown in FIG. 2, the large-scale MIMO satellite mobile communication method disclosed in an embodiment of the present invention is applied to user terminals, and the method comprises:

the user terminal periodically sends a detecting signal to the satellite or feeding spatial angle information, average channel energy or geographical location information of the user to the satellite; the satellite or gateway station uses spatial angle information of the user terminals to group the users to be served in the coverage area to form space division user groups, wherein the user terminals in the same space division user group use the same time-frequency resources to communicate with the satellite, while the user terminals in different space division user groups use different time-frequency resources to communicate with the satellite;

the user terminal receives satellite signals and makes compensation for the frequency and time of downlink received signals by using Doppler frequency shift resulted from the movement of the satellite and minimum propagation time delay of long-distance propagation, wherein the satellite signals received by the user terminal are signals generated by the satellite by performing downlink precoding with statistical channel information, including spatial angle information and average channel energy, and then being sent through a channel;

the user terminal uses Doppler frequency shift resulted from the movement of the satellite and minimum propagation time delay of long-distance propagation to make compensation for the frequency and time of uplink transmission signals, and then sends the signals to the satellite; the satellite processes the uplink received signals by using an uplink receiving processing vector after the satellite receives the signals, wherein the uplink receiving processing vector is calculated by the satellite by using statistical channel information including spatial angle information and average channel energy.

The Doppler frequency shift resulted from the movement of the satellite and the minimum propagation time delay of long-distance propagation are estimated by the user terminal according to a received synchronization signal, or calculated with the location information of the user terminal and the satellite; with the movement of the satellite or the user terminal, the Doppler frequency shift and the minimum propagation time delay information are updated dynamically, and the frequency and time compensation values are changed adaptively.

Hereunder the method in the embodiments of the present invention will be further described in specific implementation scenarios. There is no restriction on the specific scenarios in the method provided by the present invention. For implementations in scenarios other than the exemplary scenarios described in the present invention, the person skilled in the art can make adaptive adjustments according to the specific scenarios on the basis of the technical idea of the present invention by using existing knowledge.

(1) Configuration of the System at the Satellite Side

Considering the scenario of a single satellite, which may be low-orbit satellite, medium-orbit satellite or high-orbit satellite, the satellite side is equipped with an antenna array, which may be one-dimensional or two-dimensional array with dozens to hundreds of antennas). The antenna array or large-scale antenna array may be arranged into an appropriate shape, according to requirements such as quantity and ease of installation. The most basic antenna array is a two-dimensional Uniform Planar Array (UPA), i.e., the antenna units are uniformly arranged in the horizontal and vertical directions, and the spacing between adjacent antenna units may be $\lambda/2$ or $\lambda/\sqrt{3}$, wherein $\lambda$ is the carrier wavelength.

(2) Channel Model

Figure 3:
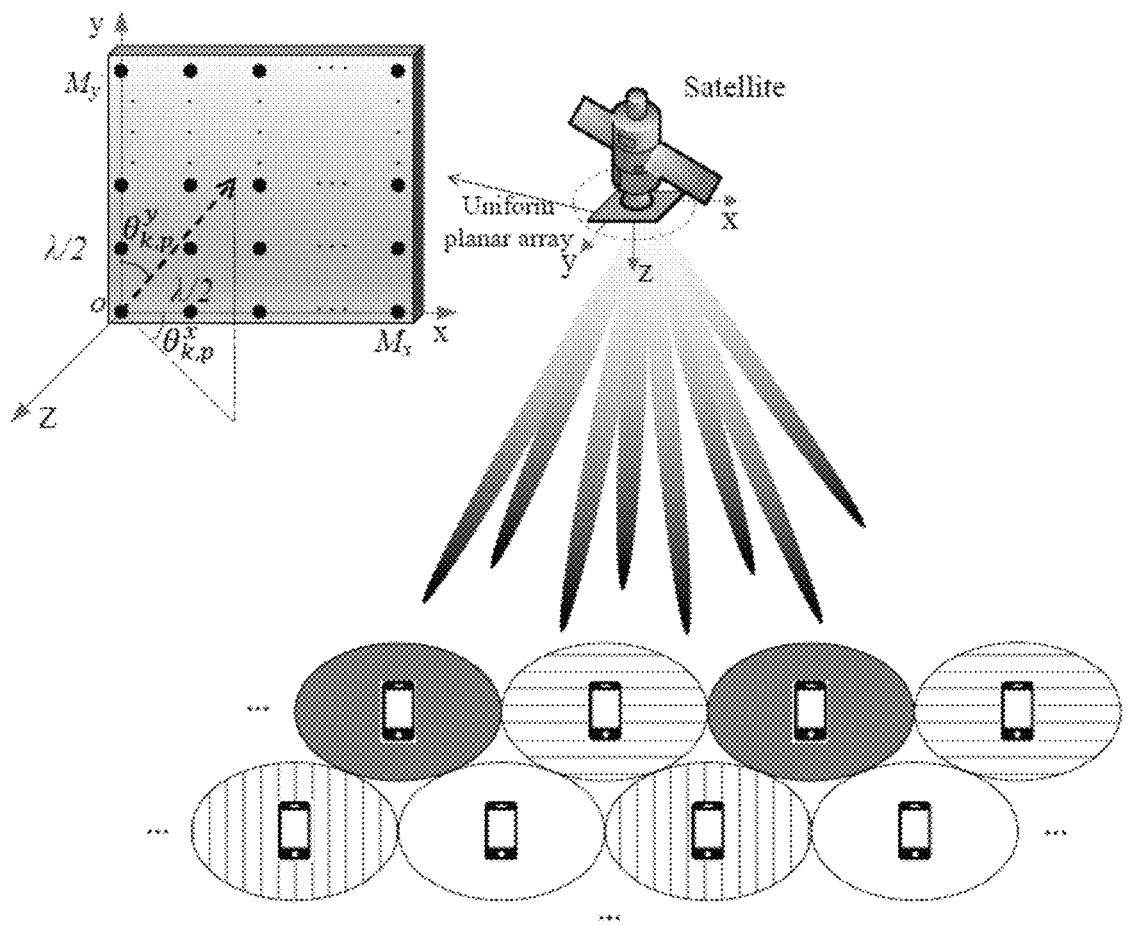
FIG. 3 is a schematic view of the large-scale MIMO satellite mobile communication system.

For example, a single satellite communicates with multiple users, as shown in FIG. 3. Assuming that the satellite side is equipped with a UPA, antenna units arranged in X-axis and Y-axis directions are $M_x$ and $M_y$ respectively, and the user side is equipped with a single antenna. The total number of antennas of the satellite is denoted as $M=M_x M_y$.

In the downlink, the channel vector that varies with time t and frequency f between the user k and the satellite may be expressed as:

$$g_k^{dl}(t, f) = \sum_{p=0}^{P_k-1} g_{k,p}^{dl} \cdot \exp\{j2\pi(tv_{k,p} - f\tau_{k,p})\} \cdot v_{k,p} \quad (1)$$

Wherein, $j=\sqrt{-1}$ is a pure imaginary number, $P_k$ represents the multipath number of user k, $g_{k,p}^{dl}$, $v_{k,p}$, $\tau_{k,p}$ and $v_{k,p} \in \pounds^{M \times 1}$ represent the complex gain, Doppler frequency shift, propagation time delay and downlink array direction vector of the p-th path of user k respectively.

The Doppler frequency shift $v_{k,p}$ of the p-th path of user k is mainly composed of two independent parts: Doppler frequency shift $v_{k,p}^{sat}$ of the satellite resulted from the movement of the satellite and Doppler frequency shift $v_{k,p}^{ut}$ of the user resulted from the movement of the user. Since the satellite is far away from the users on the ground, the Doppler frequency shift $v_{k,p}^{sat}$ of the satellite may be regarded as the same value for different propagation paths p of user k, thus set $v_{k,p}^{sat}=v_k^{sat}$. On the other hand, the Doppler frequency shift $v_{k,p}^{ut}$ of the user is usually different for different propagation paths p.

Since the satellite is far away from the users, the propagation time delay $\tau_{k,p}$ of the p-th path of user k is greater than that in the terrestrial mobile network. Here $$\tau_k^{min} = \min_p \{\tau_{k,p}\}$$

and $$\tau_k^{max} = \max_p \{\tau_{k,p}\}$$

are defined as the minimum propagation time delay and the maximum propagation time delay of user k, respectively, then $\tau_k^{max}-\tau_k^{min}$ is the channel time delay extension of user k. To simplify the symbols, denote $\tau_{k,p}^{ut} @ \tau_{k,p}-\tau_k^{min}$.

The downlink array direction vector $v_{k,p}$ of the p-th path of user k may be expressed as:

$$v_{k,p} @ v_{k,p}^x \otimes v_{k,p}^y = v_x(\varphi_{k,p}^x) \otimes v_y(\varphi_{k,p}^y) \quad (2)$$

Wherein, $v_d \in \pounds^{M_d \times 1}$ is the downlink array direction vector in the X-axis or Y-axis direction, $d \in \{x,y\} @ D$, and $\otimes$ means solving the Kronecker product of two matrices or vectors, and $$v_d(\varphi) = \frac{1}{\sqrt{M_d}} \left[ 1 \ \exp\left\{ j2\pi \frac{\delta^d}{\lambda_{dl}} \varphi \right\} ... \exp\left\{ -j2\pi (M_d-1) \frac{\delta^d}{\lambda_{dl}} \varphi \right\} \right]^T \quad (3)$$

Wherein $\delta^d$ is the spacing between antenna units in the X-axis or Y-axis direction, $\lambda_{dl}=c/f_{dl}$ is the downlink carrier wavelength, $c=3\times10^8$ m/s is the speed of light, $f_{dl}$ is the downlink carrier frequency, and T means the transposition of a matrix or vector. If the satellite side is equipped with an antenna array in another form, $v_{k,p}$ may be simply replaced with a corresponding array direction vector.

In the channel model, the relationship between the parameters $\varphi_{k,p}^x$ and $\varphi_{k,p}^y$ and the spatial angle may be expressed as $\varphi_{k,p}^x=\sin(\theta_{k,p}^y)\cos(\theta_{k,p}^x)$ and $\varphi_{k,p}^y=\cos(\theta_{k,p}^y)$, wherein $\theta_{k,p}{}^x$ and $\theta_{k,p}{}^y$ are the included angles between the transmission signal and the X-axis and Y-axis respectively, i.e., Angles of Departure (AoDs). In this embodiment, since the satellite side is equipped with a two-dimensional antenna array, the spatial angle corresponding to the p-th path of user k is a two-dimensional vector, which is expressed as ($\theta_{k,p}{}^x$, $\theta_{k,p}{}^y$); for an one-dimensional antenna array, the spatial angle is a scalar quantity. In satellite communication, since the users are far away from the satellite, the AoDs corresponding to different multipath signals of the same user may be considered to be identical approximately. Therefore, the downlink array direction vector $v_{k,p}$ of user k may be denoted in a simplified form as:

$$v_{k,p}=v_k=v_k{}^x \otimes v_k{}^y = v_x(\varphi_k{}^x) \otimes v_y(\varphi_k{}^y) \qquad (4)$$

Wherein, $\varphi_k{}^x = \sin(\theta_k{}^y)\cos(\theta_k{}^x)$ and $\varphi_k{}^y = \cos(\theta_k{}^y)$, and both have a value range of $[-1,1)$. The spatial angle of user k is denoted as $(\theta_k{}^x, \theta_k{}^y)$, then the downlink array direction vector $v_k$ of user k contains corresponding spatial angle information.

The downlink channel vector that varies with time t and frequency f between the user k and the satellite may be re-expressed as:

$$g_k^{dl}(t,f) = v_k \cdot g_k^{dl}(t,f) \cdot \exp\{j2\pi[tv_k^{sat} - f\tau_k^{min}]\} \qquad (5)$$

Wherein, $g_k^{dl}(t,f)$ is the downlink channel gain of user k that varies with time t and frequency f.

$$g_k^{dl}(t,f) @ \sum_{p=0}^{P_k-1} g_{k,p}^{dl} \cdot \exp\{j2\pi[t(v_{k,p} - v_k^{sat}) - f(\tau_{k,p} - \tau_k^{min})]\} = \qquad (6)$$

$$\sum_{p=0}^{P_k-1} g_{k,p}^{dl} \cdot \exp\{j2\pi[tv_{k,p}^{ut} - f\tau_{k,p}^{ut}]\}$$

The average channel energy of the user k is defined as:

$$E\{|g_k^{dl}(t,f)|^2\} = \gamma_k \qquad (7)$$

If $g_k^{dl}(t,f)$ follows Rice distribution and the Rice factor is $\kappa_k$, then $$g_k^{dl}(t,f): CN\left(\sqrt{\frac{k_k \gamma_k}{k_k+1}}, \frac{\gamma_k}{k_k+1}\right) \qquad (8)$$

In a TDD system, the uplink channel is the transposition of the downlink channel; however, in a FDD system, the uplink and downlink use different carrier frequencies. When the carrier interval between uplink and downlink is small, the multipath number, Doppler frequency shift and propagation time delay in the uplink channel model may be considered to be approximately the same as the $P_k$, $v_{k,p}$ and $\tau_{k,p}$ in the downlink channel model. Therefore, the uplink channel vector that varies with time t and frequency f between user k and the satellite may be expressed as:

$$g_k^{ul}(t,f) = u_k \cdot g_k^{ul}(t,f) \cdot \exp\{j2\pi[tv_k^{sat} - f\tau_k^{min}]\} \qquad (9)$$

Wherein $$g_k^{ul}(t,f) @ \sum_{p=0}^{P_k-1} g_{k,p}^{ul} \cdot \exp\{j2\pi[tv_{k,p}^{ut} - f\tau_{k,p}^{ut}]\}$$

is the uplink channel gain of user k that varies with time t and frequency f, and the uplink average channel energy may be expressed as:

$$E\{|g_k^{ul}(t,f)|^2\} = \gamma_k \qquad (10)$$

$u_k$ is the uplink array direction vector of user k.

$$u_k = u_k{}^x \otimes u_k{}^y = u_v(\varphi_k{}^x) \otimes u_y(\varphi_k{}^y) \in \pounds^{M \times 1} \qquad (11)$$

Wherein $u_d(\varphi) \in \pounds^{M_d \times 1}$ is the uplink array direction vector in the X-axis or Y-axis direction, and $d \in \{x,y\} @ D$. The definition of $u_d(\varphi)$ is similar to that of $v_d(\varphi)$, and may be expressed as:

$$u_d(\varphi) = \frac{1}{\sqrt{M_d}}\left[1 \ \exp\left\{-j2\pi\frac{\delta^d}{\lambda_{ul}}\varphi\right\} \ \ldots \ \exp\left\{-j/2\pi(M_d-1)\frac{\delta^d}{\lambda_{ul}}\varphi\right\}\right]^T \qquad (12)$$

Wherein $\lambda_{ul} = c/f_{ul}$ is the uplink carrier wavelength and $f_{ul}$ is the uplink carrier frequency. The uplink array direction vector $u_k$ of user k contains corresponding spatial angle information.

(3) Acquisition of Statistical Channel Information

The statistical channel information of the user terminals, such as spatial angle or average channel energy, is obtained through an uplink detecting process or a feedback information of each user terminal. In the uplink detecting process, each user periodically sends a detecting signal, and the satellite estimates the spatial angle and average channel energy information of each user according to the received detecting signal. For example, the satellite estimates the channel parameters in each period in which a detecting signal is received, and then statistical parameters are obtained by averaging the estimation results in multiple periods. Specifically, the estimated values of parameters $\varphi_k{}^x$ and $\varphi_k{}^y$ may be obtained with a classical arrival angle estimation algorithm, such as MUSIC algorithm or ESPRIT algorithm; the estimated value of parameter $\gamma_k$ may be obtained by obtaining the amplitude of uplink channel gain with a LS algorithm firstly and then averaging in time and frequency. The estimated values of the channel parameters $\gamma_k$, $\varphi_k{}^x$ and $\varphi_k{}^y$ of user k by the satellite in the s-th signal period are denoted as $\hat{\gamma}_{k,s}$, $\hat{\varphi}_{k,s}{}^x$, and $\hat{\varphi}_{k,s}{}^y$, respectively, then the weighted average values of $\hat{\gamma}_{k,s}$, $\hat{\varphi}_{k,s}{}^x$, and $\hat{\varphi}_{k,s}{}^y$ in S signal periods are taken as the final estimated values, i.e.:

$$\bar{\gamma}_k = \sum_{s=1}^{S} w_s \cdot \hat{\gamma}_{k,s} \qquad (13)$$

$$\bar{\varphi}_k^x = \sum_{s=1}^{S} w_s \cdot \hat{\varphi}_{k,s}^x \qquad (14)$$

$$\bar{\varphi}_k^y = \sum_{s=1}^{S} w_s \cdot \hat{\varphi}_{k,s}^y \qquad (15)$$

Wherein $w_s \geq 0$ is the weight in the s-th signal period which meets $\sum_{s=1}^{S} w_s = 1$.

The feedback information of each user terminal is spatial angle information, average channel energy or geographical location information of the user. The feedback information of each user terminal may be obtained with a channel parameter estimation method utilizing a downlink synchronization signal or detecting signal, and the geographical location information may also be obtained by means of a navigation system. In the case that the terminals feed the geographical location information back to the satellite, the satellite side obtains the spatial angle information of each user by using the geographical location information of the terminal and the location information of the satellite.

(4) User Grouping Method

A satellite or a gateway station in communication with the satellite through a feeder link uses spatial angle information of the user terminals to group the users to be served in the coverage area to form space division user groups, wherein the user terminals in the same space division user group use the same time-frequency resources to communicate with the satellite, while the user terminals in different space division user groups use different time-frequency resources to communicate with the satellite.

In the user grouping process, the spatial angle range of the satellite coverage area is divided into a corresponding number of sub-ranges by using several fixed reference spatial angles (scalar quantities or two-dimensional vectors), which consist of a preset number of groups of reference spatial angles, and the array direction vectors corresponding to different reference spatial angles in each reference spatial angle group are orthogonal to each other. In this embodiment, the number of the fixed reference spatial angles is $M_x M_y G_x G_y$, and the number of the reference spatial angle groups is $G_x G_y$, wherein $G_x$ and $G_y$ are positive integers, and the reference spatial angle is $(\beta_{g,m}^x, \beta_{r,n}^y)$, wherein $\beta_{g,m}^x$ and $\beta_{r,n}^y$ are determined with the following formula:

$$\sin(\beta_y^{r,n})\cos(\beta_{g,m}^x) = -1 + \frac{\Delta_x}{2} + (g + mG_x)\Delta_x @ \phi_{g,m}^x \quad (16)$$

$$\cos(\beta_{r,n}^y) = -1 + \frac{\Delta_y}{2} + (r + nG_y)\Delta_y @ \phi_{r,n}^y \quad (17)$$

Wherein $0 \leq g \leq G_x-1$, $0 \leq m \leq M_x-1$, $0 \leq r \leq G_y-1$, $0 \leq n \leq M_y-1$, $\Delta_x = 2/(M_x G_x)$ and $\Delta_y = 2/(M_y G_y)$. In addition, according to the expressions (16) and (17), the group (g,r) corresponds to $M_x M_y$ reference spatial angles, which constitutes a reference spatial angle group, and the array direction vectors corresponding to different reference spatial angles in the same reference spatial angle group are orthogonal to each other. The spatial angle ranges divided by the reference spatial angles are defined as:

$$A_{(g,r)}^{(m,n)} = \left\{ (\theta^x, \theta^y): \varphi^x \in \left[ \phi_{g,m}^x - \frac{\Delta_x}{2}, \phi_{g,m}^x + \frac{\Delta_x}{2} \right], \right. \quad (18)$$
$$\left. \varphi^y \in \left[ \phi_{r,n}^y - \frac{\Delta_y}{2}, \phi_{r,n}^y + \frac{\Delta_y}{2} \right] \right\}$$

Wherein $\varphi^x = \sin(\theta^y)\cos(\theta^x)$, $\varphi^y = \cos(\theta^y)$, $0 \leq g \leq G_x-1$, $0 \leq m \leq M_x-1$, $0 \leq r \leq G_y-1$ and $0 \leq n \leq M_y-1$. According to the expression (18), the reference spatial angle group (g,r) corresponds to $M_x M_y$ discrete spatial angle ranges.

The sub-range to which a user belongs is determined with the spatial angle information of the user, with the following specific method: the user k is assigned to the sub-range $A_{(g,r)}^{(m,n)}$ of the reference spatial angle group (g,r), if and only if the spatial angle $(\theta_k^x, \theta_k^y)$ of user k meets $$(\theta_k^x, \theta_k^y) \in A_{(g,r)}^{(m,n)} \quad (19)$$

the user terminals to be served are assigned to a space division user group. If more than one user is assigned to the same sub-range $A_{(g,r)}^{(m,n)}$, different users are assigned to different space division user groups, and the sub-range to which the users in the same space division user group belong is the sub-range corresponding to the same reference spatial angle group: the user terminals in the same space division user group use the same time-frequency resources to communicate with the satellite in the communication process, while the user terminals in different space division user groups use different time-frequency resources to communicate with the satellite in the communication process.

(5) User Terminal Receiving/Sending Processing Method

The signals received by a user terminal are the transmission signals which are generated by the satellite by performing downlink precoding by using statistical information including spatial angle and average channel energy and then sent through a channel, or the signals sent by a user terminal is processed by the satellite by using statistical information, including spatial angle and average channel energy, after the satellite receives the signals. The user terminal should use Doppler frequency shift resulted from the movement of the satellite and minimum propagation time delay of long-distance propagation to make compensation for the frequency and time of the signals received and sent by user terminal. The Doppler frequency shift resulted from the movement of the satellite and the minimum propagation time delay of long-distance propagation are estimated by the user terminal according to a received synchronization signal, or calculated with the location information of the user terminal and the satellite. With the movement of the satellite or the user terminal, the Doppler frequency shift and the minimum propagation time delay information are dynamically updated, and the frequency and time compensation values are changed adaptively.

The number of sub-carriers of Orthogonal Frequency Division Multiplex (OFDM) is denoted as $N_{us}$, the length of Cyclic Prefix (CP) is denoted as $N_{cp}$, and the sampling time interval of system is denoted as $T_s$, then the symbol duration of OFDM is $T_{us} = N_{us} T_s$, and the CP duration is $T_{cp} = N_{cp} T_s$.

The l-th downlink OFDM symbol is denoted as OFDM symbol $$\{x_{l,n}^{dl}\}_{n=0}^{N_{us}-1},$$

then the transmitted signal $x_l^{dl}(t) \in \pounds^{M \times 1}$ may be expressed as:

$$x_1^{dl}(t) = \sum_{n=0}^{N_{us}-l} x_{l,n}^{dl} \cdot \exp\left\{ j2\pi \frac{n}{T_{us}} t \right\}, -T_{cp} \leq t - 1(T_{cp} + T_{us}) < T_{us} \quad (20)$$

The received signal corresponding to user k is:

$$y_{k,1}^{dl}(t) = \int_{-\infty}^{\infty} \left[ g_k^{dl}(t,\tau) \right]^T \cdot x_1^{dl}(t-\tau) d\tau \quad (21)$$

Wherein $g_k^{dl}(t, \tau)$ is the inverse Fourier transform of $g_k^{dl}(t,f)$.

The Doppler frequency shift and propagation time delay of the received signal are compensated with the above-mentioned Doppler and time delay characteristics of the satellite channels. Denote $\tau_k^{syn}=\tau_k^{min}$ and $v_k^{syn}=v_k^{sat}$, then the compensated received signal may be expressed as:

$$y_{k,l}^{dl,syn}(t) = y_{k,l}^{dl}(t+\tau_k^{syn}) \cdot \exp\{-j2\pi(t+\tau_k^{syn})v_k^{syn}\} \quad (22)$$

Thus, the Doppler spread and propagation time delay of the received signal can be greatly reduced. The downlink received signal of user k on the n-th sub-carrier in the l-th OFDM symbol may be expressed as:

$$y_{k,l,n}^{dl} = (g_{k,l,n}^{dl})^T x_{l,n}^{dl} \quad (23)$$

Wherein $g_{k,l,n}^{dl}$ is the downlink channel vector of user k on the n-th sub-carrier in the l-th OFDM symbol, $$g_{k,l,n}^{dl} = v_k \cdot g_{k,l,n}^{dl} \in \pounds^{M \times 1} \quad (24)$$

Wherein $g_{k,l,n}^{dl} = g_k^{dl}(l(T_{us}+T_{cp}),n/T_{us})$.

Similarly, in the uplink, the user k should also compensate the transmitted signals. The uplink received signal of uplink user k on the n-th sub-carrier in the l-th OFDM symbol may be expressed as:

$$y_{1,n}^{ul} = \sum_k g_{k,l,n}^{ul} x_{k,l,n}^{ul} \in \pounds^{M \times 1} \quad (25)$$

Wherein $x_{k,l,n}^{dl}$ is the signal transmitted by user k, and $g_{k,l,n}^{dl}$ is the uplink channel vector of user k on the n-th sub-carrier in the l-th OFDM symbol, $$x_{k,l,n}^{ul} = u_k \cdot x_{k,l,n}^{ul} \in \pounds^{M \times 1} \quad (26)$$

Wherein $x_{k,l,n}^{ul} = g_k^{ul}(l(T_{us}+T_{cp}),n/T_{us})$.

(6) Calculation of Downlink Precoding Vector

The downlink precoding vector is obtained by closed-form calculation according to an average signal to loss plus noise ratio (ASLNR) criterion. Consider that a single satellite serves K single-antenna users on the same time-frequency resources in the downlink. The user set is denoted as K={0, 1, . . . , K−1}. By implementing downlink precoding at the satellite side, the received signal of user k may be expressed as:

$$y_k^{dl} = (g_k^{dl})^T \sum_{i \in K} \sqrt{q_i^{dl}} b_i s_i^{dl} + z_k^{dl} \quad (27)$$

Wherein $q_i^{dl}$ is the power allocated to user i, $b_i \in \pounds^{M \times 1}$ is the precoding vector of user i, which meets $\|b_i\|_2=1$ ($\|\cdot\|_2$ means solving the Euclidean norm of a vector), $s_i^{dl}$ is the transmission symbol for user i, and its mean value is 0 and its variance is 1, $z_k^{dl}$:CN $(0,\sigma_k^{dl})$ represents complex Gaussian additive white noise.

The ASLNR of user k is defined as:

$$ASLNR_k @ \frac{\gamma_k |(v_k)^T b_k|^2}{\sum_{i \neq k} \gamma_i |(v_i)^T b_k|^2 + \frac{1}{\rho_k^{dl}}} \quad (28)$$

Wherein, $|\cdot|$ represents absolute value calculation, and $\rho_k^{dl} @ q_k^{dl}/\sigma_k^{dl}$ is the downlink signal-to-noise ratio of user k. It can be proved that the precoding vector that maximizes $ASLNR_k$ is:

$$b_k^{aslnr} = \frac{1}{\eta_k^{aslnr}} \left[ \left( \sum_i \gamma_i v_i v_i^H + \frac{1}{\rho_k^{dl}} I_M \right)^{-1} v_k \right]^* \quad (29)$$

Wherein $\eta_k^{aslnr}$ is the normalization coefficient that makes $b_k$ meet the criterion of norm=1 $I_M \in \pounds^{M \times M}$ is the identity matrix. H and * respectively represent the conjugate transpose and conjugate of a matrix or vector, and the maximum value of $ASLNR_k$ is:

$$ASLNR_k^{max} \frac{1}{1 - \gamma_k v_k^H \left( \sum_i \gamma_i v_i v_i^H + \frac{1}{\rho_k^{dl}} I_M \right)^{-1} v_k} - 1 \quad (30)$$

(7) Calculation of Uplink Receiving Processing Vector

The uplink receiving processing vector is obtained by closed-form calculation according to an average signal to interference plus noise ratio (ASINR) criterion. In the uplink, the received signal at the satellite side is:

$$y^{ul} = \sum_k g_k^{ul} \sqrt{q^{ul}} s_k^{ul} + z^{ul} \quad (31)$$

Wherein $q^{ul}$ is the power allocated to each user, $s_k^{ul}$ is the transmission symbol of user k, and its mean value is 0 and its variance is 1, $z^{ul}$:CN $(0,\sigma^{ul} I_M)$ is complex Gaussian additive white noise. By using a linear receiving vector at the satellite side, the restored symbol of user k may be expressed as:

$$\hat{s}_k^{ul} = w_k^T y^{ul} = w_k^T \sum_i g_i^{ul} \sqrt{q^{ul}} s_i^{ul} + w_k^T z^{ul} \quad (32)$$

Wherein $w_k$ is the receiving vector of user k. The ASINR of user k is defined as:

$$ASINR_k @ \frac{\gamma_k |(u_k)^T w_k|^2}{\sum_{i \neq k} \gamma_i |(u_i)^T w_k|^2 + \frac{1}{\rho^{ul}} \|w_k\|_2^2} \quad (33)$$

$\rho_{ul}$ is the uplink signal-to-noise ratio of user k.

It can be proved that the receiving vector that maximizes $ASINR_k$ is:

$$w_k^{asinr} = \left[ \left( \sum_i \gamma_i u_i u_i^H + \frac{1}{\rho^{ul}} I_M \right)^{-1} u_k \right]^* \quad (34)$$

and the maximum value of $ASINR_k$ is:

$$ASINR_k^{max} = \frac{1}{1 - \gamma_k u_k^H \left( \sum_i \gamma_i u_i u_i^H + \frac{1}{\rho^{ul}} I_M \right)^{-1} u_k} - 1 \quad (35)$$

(8) Dynamic Update

With the movement of the satellite or the users, the channel information of each user, such as spatial angle and average channel energy, is dynamically updated, the grouping number, downlink precoding vector and uplink receiving processing vector of each user are changed adaptively, and the information such as Doppler frequency shift and minimum propagation time delay, as well as the compensation values for frequency and time of each user terminal are also changed adaptively.

Figure 4:
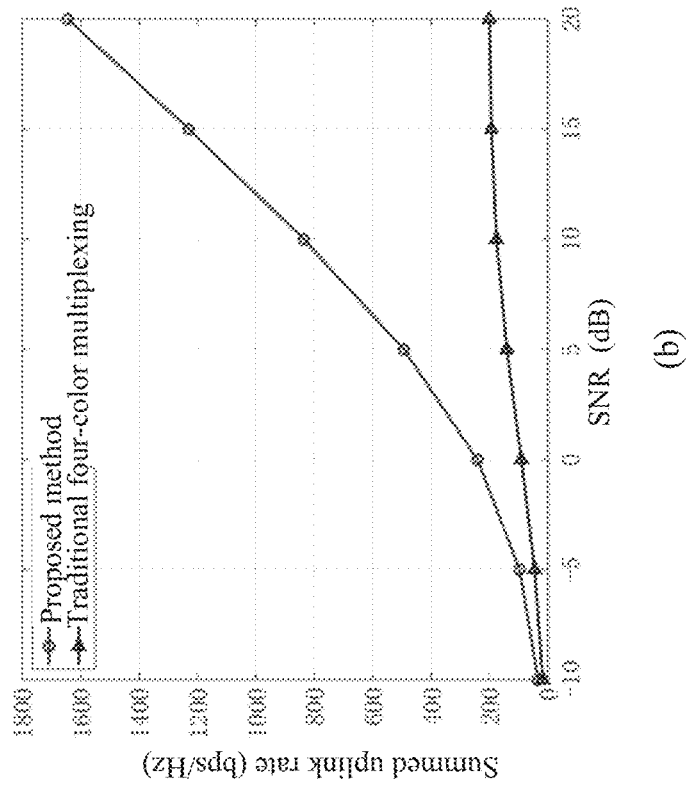
FIG. 4 is a performance comparison view of the large-scale MIMO satellite mobile communication (compared with the traditional four-color multiplexing method)
Figure 4:
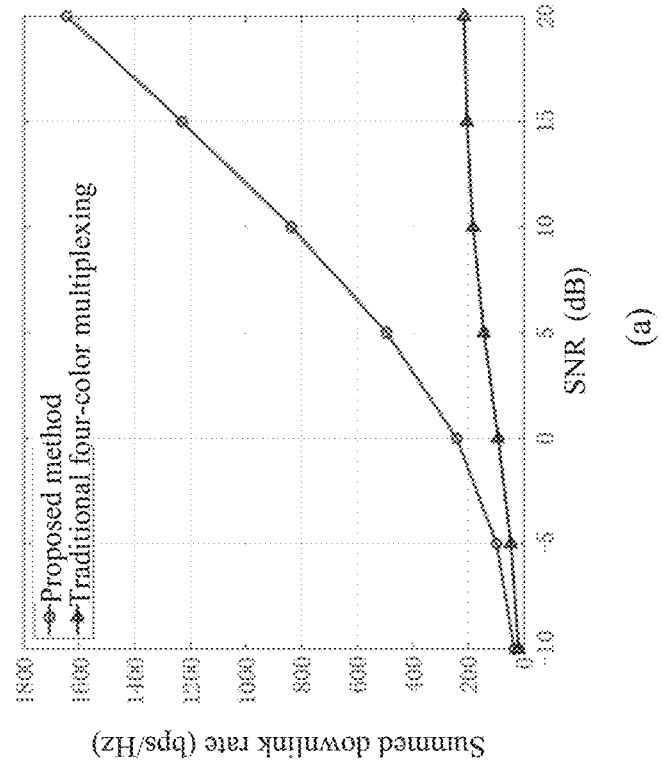

FIG. 4 shows the performance comparison curve between the method proposed in this embodiment and the traditional four-color multiplexing method. It can be seen from FIG. 4 that the summed rate performance achieved with the proposed method is about 8 times higher than that achieved with the traditional four-color multiplexing method in the uplink and downlink.

Figure 5:
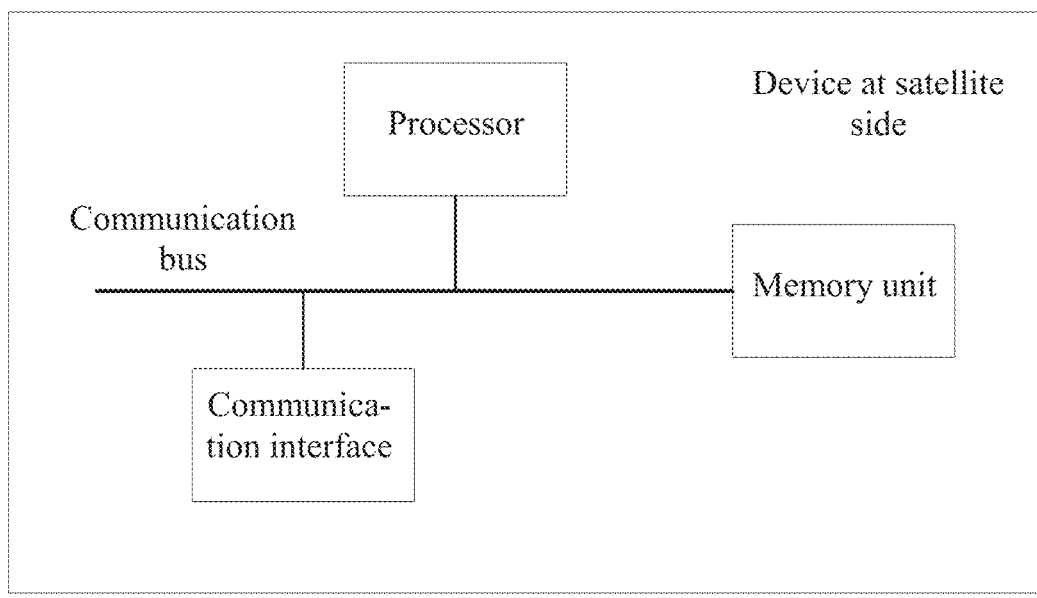
FIG. 5 is a schematic structural view of the device at the satellite side for large-scale MIMO satellite mobile communication.

Based on the same inventive concept, as shown in FIG. 5, the device at the satellite side for large-scale MIMO satellite mobile communication disclosed in an embodiment of the present invention comprises a memory unit, a processor and a computer program which is stored in the memory unit and executable on the processor, wherein the computer program, when loaded to the processor, implements the above-mentioned large-scale MIMO satellite mobile communication method applied to a satellite or gateway station.

In a specific implementation, the device comprises a processor, a communication bus, a memory unit and a communication interface. The processor may be a general-purpose central processing unit (CPU), a microprocessor, an application-specific integrated circuit (ASIC) or one or more integrated circuits for controlling the execution of the program in the technical solution of the present invention. The communication bus may comprise a path for transferring information among the above components. The communication interface may employ any transceiver or similar device to communicate with other devices or a communication network. The memory unit may be read-only memory (ROM) or other types of static storage devices that can store static information and instructions, random access memory (RAM) or other types of dynamic storage devices that can store information and instructions, or electrically erasable programmable read-only memory (EEPROM), CD-ROM or other optical disk storage devices, disk storage media or other magnetic storage devices, or any other media that can be used to carry or store desired program codes in the form of instructions or data structures and can be accessed by a computer, but is not limited to these devices. The memory unit may exist separately and be connected with the processor through a bus. Alternatively, the memory unit may be integrated with the processor.

Wherein, the memory unit is used to store the application program codes for executing the technical solution of the present invention, and is controlled by the processor. The processor is used to execute the application program codes stored in the memory unit, so as to implement the communication method provided in the above embodiment. The processor may include one or more CPUs or multiple processors, and each of processors may be a single-core processor or multi-core processor. The processor herein may refer to one or more devices, circuits, and/or processing cores for processing data (e.g., computer program instructions).

Figure 6:
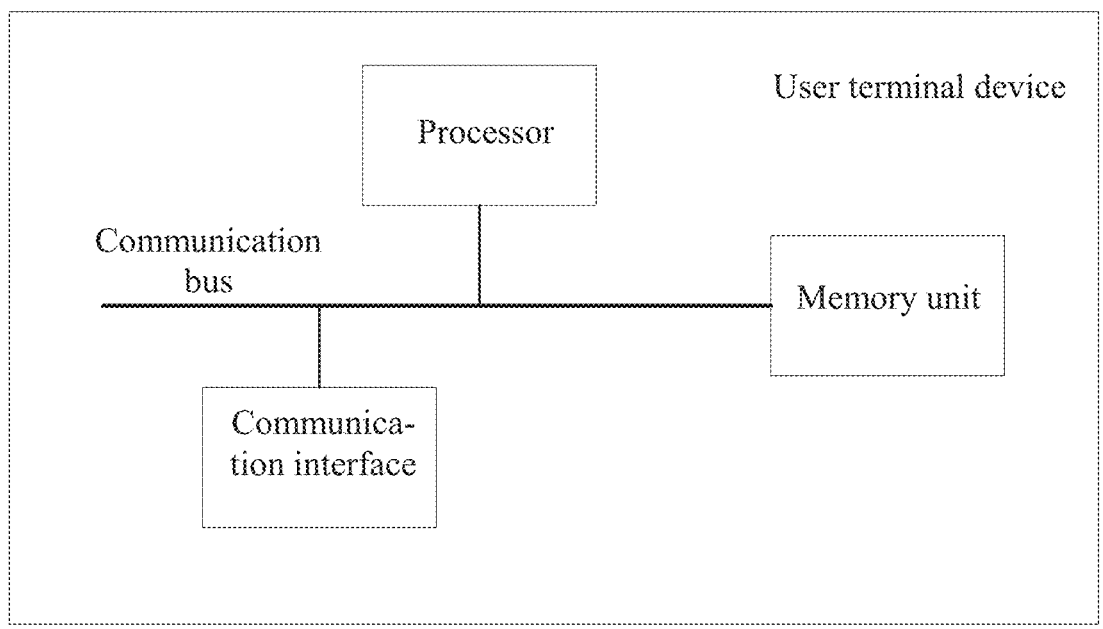
FIG. 6 is a schematic structural view of the user terminal device for the large-scale MIMO satellite mobile communication.

Based on the same inventive concept, as shown in FIG. 6, the user terminal device for large-scale MIMO satellite mobile communication disclosed in an embodiment of the present invention comprises a memory unit, a processor and a computer program which is stored in the memory unit and executable on the processor, wherein the computer program, when loaded to the processor, implements the above-mentioned large-scale MIMO satellite mobile communication method applied to a user terminal. In a specific implementation, the user terminal device comprises a processor, a communication bus, a memory unit and a communication interface, and may be in the form of any handheld device, vehicle-mounted device, wearable device or computing device that has a wireless communication function, or any other processing device connected to a wireless modem.

Figure 7:
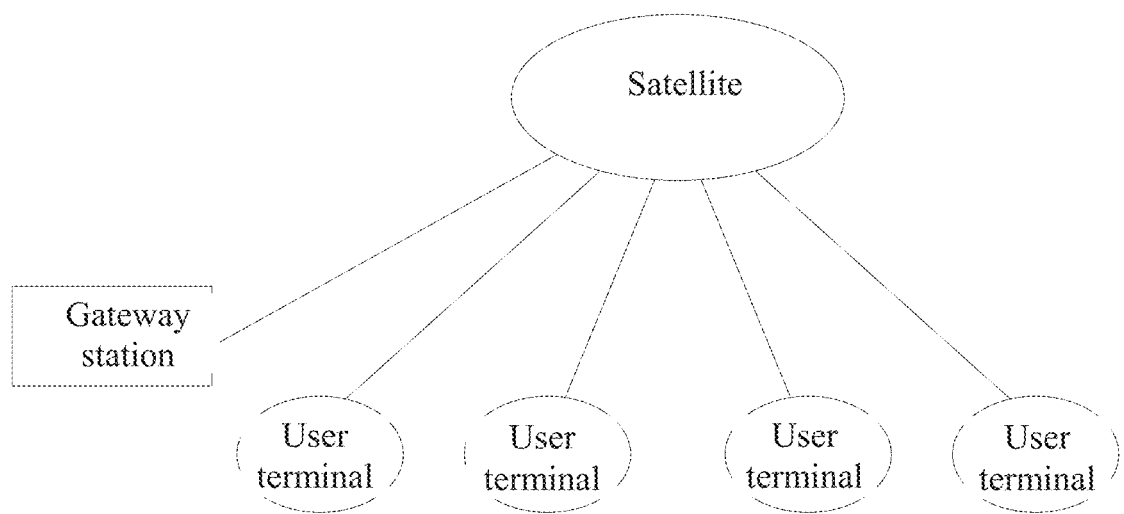
FIG. 7 is a schematic structural view of the large-scale MIMO satellite mobile communication system.

As shown in FIG. 7, the large-scale MIMO satellite mobile communication system disclosed in an embodiment of the present invention comprises a satellite and user terminals, wherein the satellite is equipped with an antenna array to communicate with the user terminals in its coverage area: the satellite or a gateway station associated to the satellite is configured to: use spatial angle information of the user terminals to group the users to be served in the coverage area to form space division user groups, wherein the user terminals in the same space division user group use the same time-frequency resources to communicate with the satellite, while the user terminals in different space division user groups use different time-frequency resources to communicate with the satellite;

for the user terminals in the same space division user group, use statistical channel information of each user terminal, including spatial angle information and average channel energy, to calculate a downlink precoding vector or uplink receiving processing vector corresponding to each user terminal, and use the obtained vector to perform downlink precoding transmission or uplink received signal processing: perform user grouping and uplink and downlink transmission processes dynamically with the change of the statistical channel information, in the movement process of the satellite or user terminals;

the user terminal is configured to: send a detecting signal to the satellite periodically or feed spatial angle information, average channel energy or geographical location information of the user to the satellite, receive satellite signals and use Doppler frequency shift resulted from the movement of the satellite and minimum propagation time delay of long-distance propagation to make compensation for the frequency and time of downlink received signals; and use Doppler frequency shift resulted from the movement of the satellite and minimum propagation time delay of long-distance propagation to make compensation for the frequency and time of uplink transmission signals, and then send the signals to the satellite.

The above embodiment of large-scale MIMO satellite mobile communication system and the embodiments of large-scale MIMO satellite mobile communication method belong to the same inventive concept. Reference may be made to the method embodiments for the implementation details of the specific technical means for the system, which will not be repeated here. All of the content not involved in the present invention belongs to the prior art.

The above are only specific embodiments of the present invention, but the protection scope of the present invention is not limited to this. The person skilled in the art can easily recognize that various variations or replacement, within the technical scope disclosed in the present invention, can be covered by the protection scope of the present invention. Therefore, the protection scope of the present invention should be subject to the protection scope of the claims.

The invention claimed is:

1. A large-scale multiple-input multiple-output (MIMO) satellite mobile communication method applied to a satellite or a gateway station associated to the satellite, wherein the satellite is equipped with an antenna array to communicate with user terminals in a coverage area; the method comprises the following steps:

- using spatial angle information of the user terminals, by the satellite or gateway station, to group the users to be served in the coverage area to form space division user groups, wherein the user terminals in the same space division user group use a same time-frequency resources to communicate with the satellite, while the user terminals in different space division user groups use different time-frequency resources to communicate with the satellite;
- for the user terminals in the same space division user group, using statistical channel information, including spatial angle information and average channel energy, of each user terminal to calculate a downlink precoding vector or uplink receiving processing vector corresponding to each user terminal, and using the obtained vector to perform downlink precoding transmission or uplink received signal processing, by the satellite or gateway station;
- performing user grouping and uplink and downlink transmission process dynamically, with a change of the statistical channel information, in a movement process of the satellite or user terminals,
- wherein in the user grouping process, the spatial angle range of the satellite coverage area is divided into a corresponding number of sub-ranges by using several fixed reference spatial angles, which consist of a preset number of groups of reference spatial angle, and the array direction vectors corresponding to different reference spatial angles in each reference spatial angle group are orthogonal to each other; the spatial angle information of each user is utilized to determine a sub-range to which the user belongs; the user terminals to be served are grouped into space division user groups, different users in the same sub-range are assigned to different user groups, and the sub-range to which the users in the same user group belong corresponds to the same reference spatial angle group; the users in the space division user group use the same time-frequency resources to communicate with the satellite in the communication process, while the users in different space division user groups use different time-frequency resources to communicate with the satellite in the communication process.

2. The large-scale MIMO satellite mobile communication method according to claim 1, wherein the statistical channel information is obtained through an uplink detecting process or from feedback information of the user terminals; in the uplink detecting process, each user sends a detecting signal periodically, and the satellite estimates the spatial angle or average channel energy information of each user according to the received detecting signal; the feedback information of each user terminal includes the spatial angle information, average channel energy and geographical location information of the user.

3. The large-scale MIMO satellite mobile communication method according to claim 1, wherein the downlink precoding vector is calculated according to an average signal to loss plus noise ratio (ASLNR) criterion; the ASLNR of a user terminal is the ratio of the average power or expected power of signals received by the user when the signals are sent to the user to the sum of the average power or expected power leaked to other users and the power of noise, and the downlink precoding vector maximizes ASLNR of the user terminal; the downlink precoding vector is obtained by closed-form calculation with the spatial angle information and the average channel energy.

4. The large-scale MIMO satellite mobile communication method according to claim 1, wherein the uplink receiving processing vector is obtained by closed-form calculation according to an average signal to interference plus noise ratio (ASINR) criterion; the ASINR of a user terminal is the ratio of the average power or expected power of signals sent by the user to the sum of the average power or expected power of signals sent by other users and the power of noise in signals formed by a user receiving processing vector, and the uplink receiving processing vector maximizes ASINR of the user terminal; the uplink receiving processing vector is obtained by closed-form calculation with the spatial angle information and the average channel energy.

5. A device at the satellite side for large-scale MIMO satellite mobile communication, comprising a memory unit, a processor and a computer program which is stored in the memory unit and executable on the processor, wherein the computer program, when loaded to the processor, implements the large-scale MIMO satellite mobile communication method according to claim 1.

\* \* \* \* \*